(12) United States Patent
Schneider et al.

(10) Patent No.: US 9,308,996 B2
(45) Date of Patent: Apr. 12, 2016

(54) LUGGAGE COMPARTMENT AND MEANS OF TRANSPORT (71) Applicant: Airbus Operations GmbH, Hamburg (DE)

(72) Inventors: Uwe Schneider, Jork (DE); Patrick Rollfink, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 6 days.

(21) Appl. No.: 14/271,499

(22) Filed: May 7, 2014

(65) Prior Publication Data

US 2014/0332628 A1 Nov. 13, 2014

(30) Foreign Application Priority Data

May 10, 2013 (EP) .................... 13167302

(51) Int. Cl.
B64D 11/00 (2006.01)
B60R 5/00 (2006.01)

(52) U.S. Cl.
CPC ............... *B64D 11/003* (2013.01); *B60R 5/00* (2013.01)

(58) Field of Classification Search
CPC ..... B64D 11/003; B61D 37/003; B60R 5/003
See application file for complete search history.

(56) References Cited

U.S. PATENT DOCUMENTS

| 5,820,076 A * | 10/1998 | Schumacher et al. ..... 244/118.5 |
| 8,622,344 B2 | 1/2014 | Vine et al. |
| 2001/0011692 A1 | 8/2001 | Sprenger et al. |
| 2013/0026293 A1 | 1/2013 | Schneider et al. |

FOREIGN PATENT DOCUMENTS

| EP | 2492194 A1 | 8/2012 |
| WO | 2013017506 A1 | 2/2013 |

OTHER PUBLICATIONS

European Searching Authority, Extended European Search Report for 13167302.2 Mailed Apr. 4, 2014.

* cited by examiner

*Primary Examiner* — Tien Dinh
*Assistant Examiner* — Richard R Green
(74) *Attorney, Agent, or Firm* — Ingrassia Fisher & Lorenz, P.C.

(57) ABSTRACT

A luggage compartment for a means of transport and a means of transport with a luggage compartment are provided. The luggage compartment comprises a housing with a pivotably attached connecting element and with a sliding element. The connecting element is adapted for being pivotably attached to a first structural element and the sliding element is adapted for moving along a rail connected to a second structural element. The luggage compartment is easy to manufacture and to maintain.

14 Claims, 4 Drawing Sheets

LUGGAGE COMPARTMENT AND MEANS OF TRANSPORT

CROSS-REFERENCE TO RELATED APPLICATION

This application claims priority to European Patent Application No. 13 167 302.2, filed May 10, 2013, which is incorporated herein by reference in its entirety.

TECHNICAL FIELD

The technical field relates to a luggage compartment for being mounted in a means of transport and to a means of transport with a luggage compartment. The luggage compartment comprises a connecting element for attaching a housing of the luggage compartment to a first structural element of the means of transport, and a sliding element adapted for being movably connected to a rail attached to a second structural element of the means of transport.

BACKGROUND

Luggage compartments racks for a means of transport can be adapted as fixed bins or as pivoting bins. On the one hand, the fixed bins are closable by means of a lid. On the other hand, the pivoting bins are rotatable from an open position to a closed position, e.g., around a static rotation axis of the pivoting bin.

DE 10 2008 049 639 A1 discloses a swivelable hatrack with a static rotation axis in a passenger cabin of an aircraft. The housing of the hatrack has the shape of a semicircle.

US Publication No. 2011/186681 A1 pertains to a movable luggage rack that is adapted for being installed above a seat region. The movable luggage rack comprises a fixed rotation axis.

In addition, other objects, desirable features and characteristics will become apparent from the subsequent summary and detailed description, and the appended claims, taken in conjunction with the accompanying drawings and this background.

SUMMARY

Hereinafter, directions in a means of transport are defined in terms of a Cartesian coordinate system comprising an x-direction, a y-direction and a z-direction. The x-direction is directed in a travelling direction of the means of transport. For example, relating to an aircraft, the x-direction is parallel to the longitudinal direction of the aircraft fuselage and points from the back of the aircraft to the front of the aircraft. The y-direction is aligned horizontally and perpendicularly to the x-direction. For example, the y-direction is parallel to a floor of the means of transport and directed from a centre point to an outside of the means of transport. The z-direction is aligned vertically and perpendicularly to the x-direction and is pointing upwards.

The features hereinafter defined for an embodiment of the present disclosure directed to a luggage compartment also apply to embodiments of the present disclosure directed to a means of transport with a luggage compartment and vice-versa.

According to one of various aspects of the present disclosure, a luggage compartment for being mounted in a means of transport is disclosed. The luggage compartment comprises a housing for storing luggage, a connecting element for mounting the housing to a first structural element of the means of transport, which connecting element is pivotably attached to the housing at a first section of the connecting element, and a sliding element attached to the housing, The connecting element is adapted for being pivotably attached to the first structural element of the means of transport at a second section of the connecting element, and the sliding element is adapted for being movably connected to a rail. Which rail is attached to a second structural element of the means of transport.

The first and the second structural elements may refer to a frame or a stringer of a fuselage of the means of transport, e.g. an aircraft fuselage. For example, a frame comprises a base portion which may be adapted for receiving loads in a longitudinal direction of the fuselage, i.e. in x-direction. The sliding element may thus transfer loads in x-direction directly to the base portion of a structural element, which base portion is adapted for receiving the loads in x-direction.

The first and second structural elements may refer to different structural elements or to different portions of one structural element.

Hereinafter, a luggage compartment may refer to a hatrack for storing luggage and for being mounted in an overhead region of a means of transport, and a means of transport may refer to an aircraft, a train, a ship, or a bus. For example, the luggage compartment is to be installed above a seat row of a passenger cabin of a means of transport.

The housing of the luggage compartment is, e.g., formed as a chute with an inside volume for storing luggage such that the luggage can be placed into the housing. The inside volume of the housing may be defined by the outer walls of Me housing. For example, the housing has a shape of a cuboid. In other words, the housing has a rectangular cross-section, Thus, the housing may be adapted for receiving rectangular luggage pieces, such as suitcases or trolleys.

The connecting element is, for example, an elongated element which is pivotably connected to the housing in a first portion of the connecting element, which first portion may be a first end of the connecting element. The connecting element may also have a different shape, for example the shape of a disc.

Furthermore, the connecting element may be adapted to be pivotably connected to a first structural element of the means of transport in a second portion of the connecting element, which, for example, is a second end of the connecting element. In other words, a first pivot is located on the housing to attach the connecting element to the housing, and a second pivot is located on the first structural element to attach the connecting element to the first structural element.

The rail is adapted to guide the sliding element along a direction defined by the rail. For example, the rail guides the sliding element along a straight line. The rail may also be a curved component and guide the sliding element along a curved line, e.g. along a circular path. For instance, the slider is adapted to move from a first end of the rail to a second end of the rail. Said rail may also be a part of the second structural element. Moreover, the sliding element is also adapted to rotate in the rail. Thus, when the slider is connected to the rail, the housing is rotatable around the slider.

The components of the luggage compartment, i.e., the housing and the connecting element, may be standard components. Thus, an advantage of the luggage compartment according to the present disclosure may be that the luggage compartment has low production costs. Furthermore, the luggage compartment may be mountable with standard tools and may therefore allow for a fast installation.

According to an embodiment of the present disclosure, the housing of the luggage compartment comprises a top wall, a rear wall, a bottom wall, and an opening. The sliding element is attached on an edge defined by the top wall and the rear wall of the housing, and the connecting element is pivotably attached to the top wall of the housing.

The expressions "top", "rear", and "bottom" refer to the position of the respective wall when the luggage compartment is mounted in a means of transport. For example the top wall, rear wall, bottom wall, and opening are different sides of a cuboid which are parallel to the x-direction when the luggage compartment is mounted in the means of transport. Furthermore, the housing may also comprise side walls.

For example, the connecting element is located in the center between the opening and the rear wall. Furthermore, the connecting element may also be attached to a side wall of the housing.

By locating the sliding on an edge defined by the top wall and the real wall of the housing, it is possible to mount the housing near to a structural element and/or near to an outer skin of a fuselage of the means of transport.

According to one embodiment of the present disclosure, the top wall of the housing comprises a device adapted for securing the housing to a lock striker plate attached to a third structural element.

The third structural element may be the same structural element as the first structural element and/or the second structural element.

Thus, the housing is fixable to a position such that the housing is connected or secured to a lock striker plate. For example, the housing is in a closed position when attached to the lock striker plate. Because of the closing device, the housing stays in the position connected to the lock striker plate. The housing may comprise a handling device to manipulate the closing device in order to release the housing from the lock striker plate.

According to one of various aspects of the present disclosure, a means of transport with a luggage compartment is disclosed. The luggage compartment comprises a housing for storing luggage. The housing is movable from an open position of the luggage compartment to a closed position of the luggage compartment, wherein a first axis of the housing moves along a circular first path when moving the housing from the open position to the closed position of the luggage compartment. The circular first path is defined by a connecting element pivotably attached to the housing at a first section of the connecting element, and pivotably attached to a first structural element of the means of transport at a second section of the connecting element. Furthermore, a second axis of the housing describes a second path when moving the housing from the open position to the closed position, wherein the second path is defined by a rail mounted on a second structural element of the means of transport and which is adapted for guiding a sliding element attached to the housing.

The features defined before and in the following with respect to the luggage compartment also apply to the means of transport with a luggage compartment.

The first axis is, for example, defined by a point on the housing which the connecting element is pivotably attached to, and the x-direction. The second axis is defined by the sliding element attached to the housing, and the x-direction. Thus, the housing has a rotation axis, which is aligned in x-direction, and the luggage compartment is defined to be mounted in x-direction or in travel direction. The luggage compartment may also be mounted in y-direction, i.e. perpendicular to the travel direction. In this case, the first axis is defined by the point on the housing which the connecting element is attached to, and the y-direction. Similarly, the second axis is defined by the sliding element and the y-axis, when the luggage compartment is mounted in y-direction.

The first axis moves along the first, circular path. In other words, the first path is a segment of a circle with a radius and a center point. The radius is defined by the distance between the two connecting points on the connecting element, and the center point is located at a point on the first structural element which the connecting element is attached to.

The rail is adapted to guide the sliding element along the second path defined by the rail. For example, the rail is a linear component and defines a straight second path. The rail may also be a curved component and guide the sliding element along a curved second path, e.g. along a circular path. For instance, the slider is adapted to move from a first end of the rail to a second end of the rail. Said rail may also be a part of the second structural element.

Thus, a movement of the housing with less swiveling space is provided. Furthermore, the housing can be moved without clashing into structural elements of the means of transport.

Hereinafter, a movement from an open position of the luggage compartment to a closed position of the luggage compartment may also refer to the reciprocal movement from a closed position of the luggage compartment to an open position of the luggage compartment.

According to one embodiment of the present disclosure, a movement of the first axis and a movement of the second axis are performed at the same time when moving the luggage compartment from the open position to the closed position.

Thus, the opening and the closing movement of the housing is a composed movement. In other words, the movement of the housing is composed from a rotation and a translation, and the momentary pivot axis of the housing changes its position during the opening and the closing movement.

According to one embodiment of the present disclosure, the housing comprises a top wall, a rear wall, a bottom wall, and an opening. The sliding element is attached on an edge defined by the top wall and the rear wall of the housing, and the connecting element is connected to the top wall of the housing.

The top wall refers to the wall located vertically above the bottom wall, on which bottom wall the luggage is usually placed. The opening is directed to the inside of the cabin. The rear wall may be located opposite to the opening. For example, the top wall, the rear wall, and the bottom wall are side walls of a cuboid.

For example, the connecting element is located in the center between the opening and the rear wall. Furthermore, the connecting element may also be attached on a side wall of the housing.

By locating the sliding element on an edge defined by the top wall and the rear wall of the housing, the housing is can be positioned close to a structural element and/or close to an outer skin of a fuselage of the means of transport.

According to one embodiment of the present disclosure, in the open position of the luggage compartment, the bottom wall of the housing is aligned horizontally, and, in the closed position of the luggage compartment, the opening of the housing is positioned vertically above the rear wall of the housing.

In other words, in the open position of the luggage compartment, the bottom wall is spanned by the x-direction and the y-direction. In the closed position, the bottom wall is tilted with respect to the y-direction. In other words, the closed position is achieved, when the upper wall is close to the first, second, and/or third structural element. For example, the bottom wall and the y-direction enclose an angle, which angle lies between about 30° and about 60°.

Thus, in the open position, inserting a piece of luggage into the housing is simplified, since the bottom wall, on which the luggage is usually placed, is horizontal. In other words, the housing is movable to an optimal loading position. In the closed position, the luggage is prevented from dropping from the housing, since the opening is located vertically above the rear wall.

According to one embodiment of the present disclosure, the means of transport further comprises a lock striker plate, which lock striker plate is attached to a third structural element of the means of transport, and which lock striker plate lies against a portion of the top wall of the housing in the closed position of the luggage compartment.

In the closed position, the lock striker plate is adapted to receive loads in z-direction and to transmit the loads to the third structural element. For example, the lock striker plate is a flat plate. In the closed position of the luggage compartment, e.g., at least a portion of the flat plate is in contact with the top wall of the housing.

According to one embodiment of the present disclosure, the means of transport comprises a locking mechanism for fixing the housing in the closed position of the luggage compartment, wherein the locking mechanism comprises a hook pivotably attached to the housing and an attachment element attached to the first structural element, the second structural element, or the third structural element. Furthermore, the hook is attachable to the attachment element such that the housing is fixable in the closed position of the luggage compartment.

For example, the hook is located on the top wall of the housing such that the connecting element and the hook are pivotable around the first axis located on the housing. The position of the hook may be optimized to transmit loads in the z-direction and in the y-direction, In the closed position, the loads in z-direction may be transmitted by the hook to the structural element and, in the open position, the loads in z-direction may be transmitted to the structural element by the connecting element.

In order to manipulate the locking mechanism and/or the hook, there may be a handle which, e.g., is positioned on the bottom wall of the housing or on a wall panel of a cabin interior.

According to one embodiment of the present disclosure, in the closed position of the luggage compartment, the housing of the luggage compartment is at least partly positioned in a volume defined by an outside skin of the means of transport and a wall panel.

In other words, the cabin interior comprises a recess for at least partly receiving the housing. Thus, the housing is adapted for being at least partially inserted into the above defined volume and/or recess.

According to one embodiment of the present disclosure, the bottom wall of the housing seamlessly extends a contour of a wall panel in the closed position of the luggage compartment. Thus, the luggage compartment may be at least partly integrated into the cabin interior.

According to one embodiment of the present disclosure, the bottom wall of the housing seamlessly extends a contour of a wall panel in the closed position of the luggage compartment.

For example, the bottom wall of the housing has the same surface and/or the same color as the contour wall panel. Moreover, the contour wall panel may comprise a lining element, which lining element continues on the bottom wall of the housing.

According to one embodiment of the present disclosure, the housing performs a rotational movement around a rotation axis, when moving the housing from the open position to the closed position of the luggage compartment. Furthermore, the rotation axis of the housing moves from a position close to a center of gravity of the housing towards a position of the sliding element, when moving the housing from the open position to the closed position of the luggage compartment.

Thus, in every stage of the movement of the housing, the housing has a momentary rotation axis. Since, in an early stage of the closing movement of the housing, the rotation axis is near the center of gravity, only low handling forces are required to move the housing. The housing can also be closed with little handling three when the housing comprises luggage items. In a later stage of the closing movement, the housing usually already has a momentum. Thus, because of the momentum of the housing, not much additional force is required to move the housing in the closed position, in which closed position the rotation axis is at the position of the sliding element.

According to one embodiment of the present disclosure, in the closed position of the luggage compartment, a center of gravity of the housing is located at a first vertical position, and in the open position of the luggage compartment, the center of gravity of the housing is located at a second vertical position. The first vertical position is located vertically above the second vertical position.

Thus, the potential energy of the housing in the closed position is larger than the potential energy of the housing in the open position. Thus, it is possible to move the housing from the closed position to the open position without applying a force to the housing. For example, the housing can be opened by pushing a button or by using a handle.

Because of the higher center of gravity of the housing in the closed position, a clash-free movement of the housing from the open position to the closed position is provided.

According to one embodiment of the present disclosure, the means of transport is an aircraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

As defined above, directions in a means of transport are defined in terms of a Cartesian coordinate system comprising an x-direction, a y-direction, and a z-direction. The x-direction is directed in travelling direction of the means of transport. The y-direction is aligned horizontally and perpendicularly to the x-direction. The direction is aligned vertically and perpendicularly to the x-direction.

Figure 1:
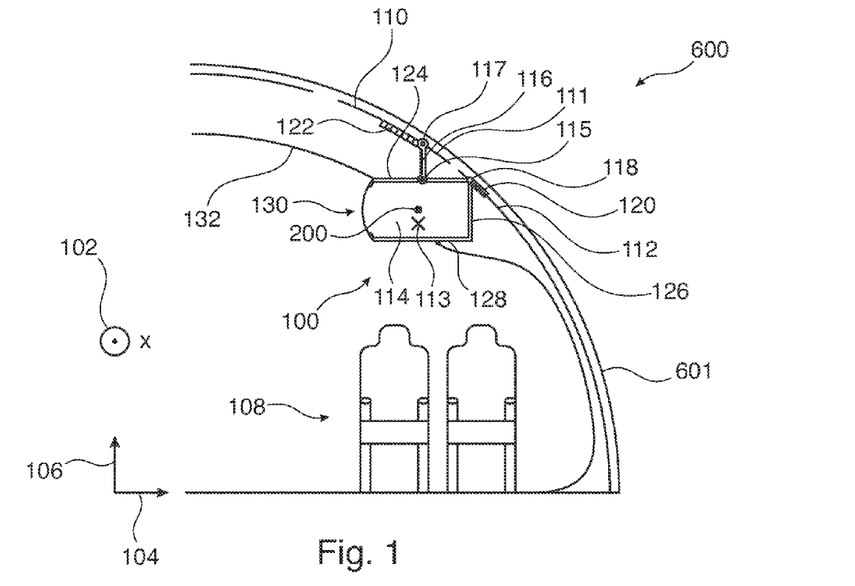
FIG. 1 is a schematic cross-section of a means of transport with a luggage compartment according to an exemplary embodiment of the present disclosure.
Figure 2:
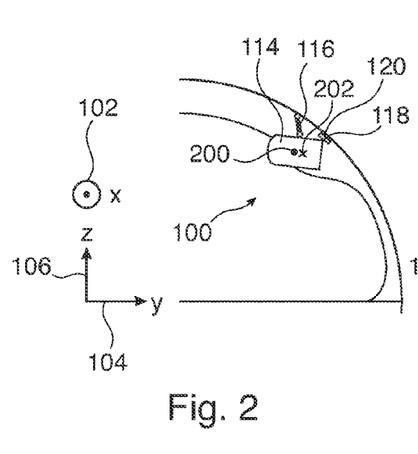
FIG. 2 is a schematic cross-section of a means of transport with a luggage compartment according to an exemplary embodiment of the present disclosure.
Figure 3:
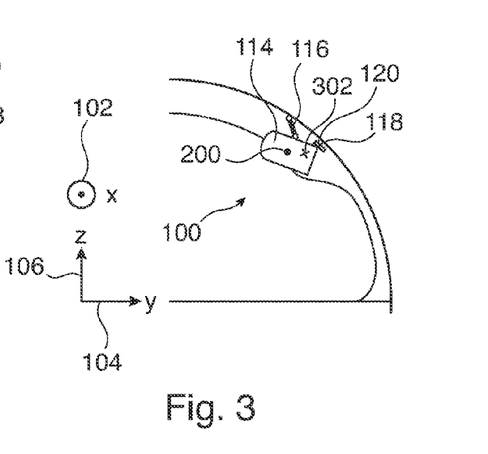
FIG. 3 is a schematic cross-section of a means of transport with a luggage compartment according to an exemplary embodiment of the present disclosure.
Figure 4:
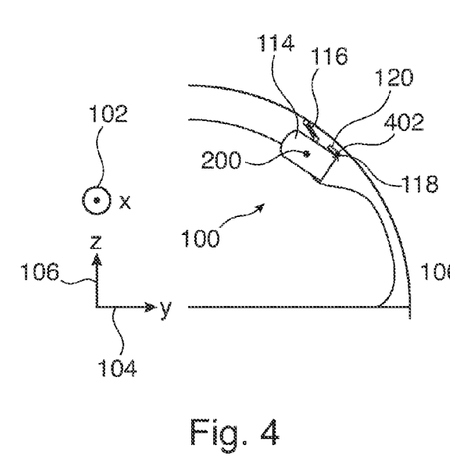
FIG. 4 is a schematic cross-section of a means of transport with a luggage compartment according to an exemplary embodiment of the present disclosure.

FIGS. 1 to 5 show a cross-section of a means of transport 600 with a luggage compartment 100. In FIG. 1, the luggage compartment 100 is shown in an open position, and in FIG. 5, the luggage compartment 100 is shown in a closed position. FIGS. 2 to 4 show intermediary steps when moving the housing 114 of the luggage compartment 100 from the open position to the closed position or vice versa.

FIG. 1 shows a vertical cross-section of a means of transport 600 in a plane spanned by the y-direction 104 and the z-direction 106. The x-direction 102 is perpendicular to the plane of the cross-section.

The means of transport has an outer skin, e.g. a circular fuselage 601. In this exemplary embodiment, a segment of the circular fuselage 601 is shown. The means of transport according to the exemplary embodiment comprises a passenger cabin with cabin seats which are arranged in rows aligned behind one another. A seat row 108 comprising two adjacent seats is shown. Furthermore, the passenger cabin comprises a wall panel 132. In the overhead region above the seat row 108, a luggage compartment 100 is installed.

The luggage compartment 100 comprises a housing 114 also referred to as chute, a connecting element 116, and a sliding element 118. The housing 114 has a rectangular cross-section in the plane spanned by the y-direction 104 and the z-direction 106. Furthermore, the housing comprises a top wall 124, a rear wall 126, a bottom wall 128, and an opening 130. In this exemplary embodiment, the top wall 124, the rear wall 126, and the bottom wall 128 are parallel to the x-direction 102, and the top wall 124 is located vertically above the bottom wall 128. Furthermore, the rear wall 126 is perpendicular to the top wall 124 and to the bottom wall 128. Thus, the top wall 124, the rear wall 126, and the bottom wall 128 are side walls of a cuboid. Since the top wall 124, the rear wall 126, and the bottom wall 128 are parallel to the x-direction 102, the luggage compartment is termed to be installed in x-direction.

In this exemplary embodiment, the connecting element 116 is shaped as a connecting rod. The connecting element 116 may also have different shapes, e.g. the connecting element 116 may also be a disc. In one portion 115 of the connecting element 116, the connecting element 116 is pivotably attached to the housing 114, e.g. to the top wall 124 of the housing, for example by means of a pivot attached in the center between the opening 130 and the rear wall 126 on the top wall 124 of the housing 114. This pivotable attachment of the connecting element 116 to the housing 114 defines a first axis 720, which first axis 720 is parallel to the x-direction 102. The connecting element is also pivotably attached to a first structural element 111 of the means of transport 600 at a second portion 117 of the connecting element 116. This pivotable attachment of the connecting element 116 to the first structural element 111 defines a rotation axis located at the pivotable attachment of the connecting element 116 to the first structural element 111, which rotation axis is parallel to the x-direction 102. Thus, the connecting element 116 can rotate around the pivotable attachment of the connecting element 116 to the first structural element 111 and around a point of the housing 114.

The sliding element 118 is attached to the housing 114 on an edge 714 between the top wall 124 and the rear wall 126. Furthermore, the sliding element 118 is adapted for being movably connected to a rail 120. Said rail 120 can be attached to a second structural element 112, or be a part of the second structural element 112. The structural elements 111 and 112 can be different structural elements or the same structural elements. For example, the first structural element 111 and the second structural element 112 refer to the same frame of a fuselage 601 of the means of transport 600. The rail 120 defines the movement of the sliding element 118, and is perpendicular to the x-direction 102. Thus, the movement of the sliding element 118 is perpendicular to the x-direction 102. Since the sliding element 118 is attached to the edge 714 of the luggage compartment 114, the edge 714 of the luggage compartment 114 moves along the rail 120. In this exemplary embodiment, the rail 120 is linear. Thus, the sliding element 118 and the edge 714 of the housing 114 perform a translational movement.

A lock striker plate 122 is attached to a third structural element 110. The third structural element 110 may be different from the first structural element 110 and the second structural element 112. In this exemplary embodiment, the lock striker plate 122 is parallel to the x-direction 102. The lock striker plate 122 is configured such that a portion of the top wall 124 of the housing 114 lies against the lock striker plate 122 in a closed position of the luggage compartment 100.

In this exemplary embodiment, the luggage compartment 100 is shown in an open position. In the open position, the bottom wall 128 of the housing 114 is aligned horizontally, i.e. in the open position the bottom wall 128 is spanned by the x-direction 102 and the y-direction. The horizontal position of the bottom wall 128 facilitates inserting a piece of luggage into the housing 114.

The loads acting on the housing 114 in z-direction 106 are mainly transferred to the first structural element 111 via the connecting element 116. The loads in x-direction and in y-direction are mainly received by the rail 118 and transferred to the second structural element 112.

The point 200 shows the center of gravity of the housing 114, e.g. when the housing 14 is empty. When the housing 114 comprises a piece of luggage, the center of gravity 200 may be positioned lower with respect to the housing, closer to the bottom wall 128. The "x" 113 indicates the momentary rotation axis of the housing 114 when moving the housing 114. The rotation axis 113 is parallel to the x-axis 102.

In FIGS. 2 to 7, not all reference signs are shown for clarity reasons.

FIG. 2 shows the housing 114 of the luggage compartment 100 in an intermediary position after moving the housing 114 from the open position to the closed position. The center of gravity 200 is still positioned at the same location with respect to the housing 114. The momentary rotation axis 202, however, has moved closer to the sliding element 118 with respect to the housing 114.

FIG. 3 shows the housing 144 of the luggage compartment 100 in an intermediary position after the position shown in FIG. 2. The sliding element 118 is close to one end of the rail 120. The center of gravity 200 is still at the same position with respect to the housing. The momentary rotation axis 302 has moved closer to the sliding element 118.

In FIG. 4, a position of the housing 114 after the position of FIG. 3 is shown. The sliding element 118 is located on one end of the rail 120. Thus, the momentary rotation axis 402 is located at the position of the sliding element 118.

Figure 5:
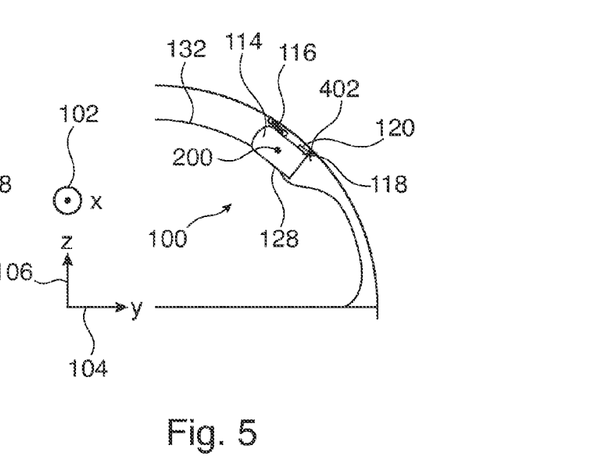
FIG. 5 is a schematic cross-section of a means of transport with a luggage compartment according to an exemplary embodiment of the present disclosure.

FIG. 5 shows the closed position of the luggage compartment 100. In the closed position, the bottom wall 128 of the housing 114 seamlessly extends a wall panel of the interior of the passenger cabin. The rotation axis 402 is located at the position of the sliding element 118, and the center of gravity 200 has not changed its position with respect to the housing 114.

The movement between FIG. 4 and FIG. 5 is the last intermediary movement when moving the housing 114 from the open position to the closed position of the luggage compartment. The movement between FIG. 4 and FIG. 5 has a fixed rotation axis 402 located at the point of the sliding element 118.

In the movement shown in FIGS. 1 to 3, the center of gravity does not change its vertical position substantially. Thus, the potential energy of the housing 114 does not change substantially. In the movement from FIGS. 3 to 5, the center of gravity 200 is moved to a higher vertical position. Thus, in the movement from FIGS. 3 to 5, the potential energy of the housing 114 rises.

Figure 6:
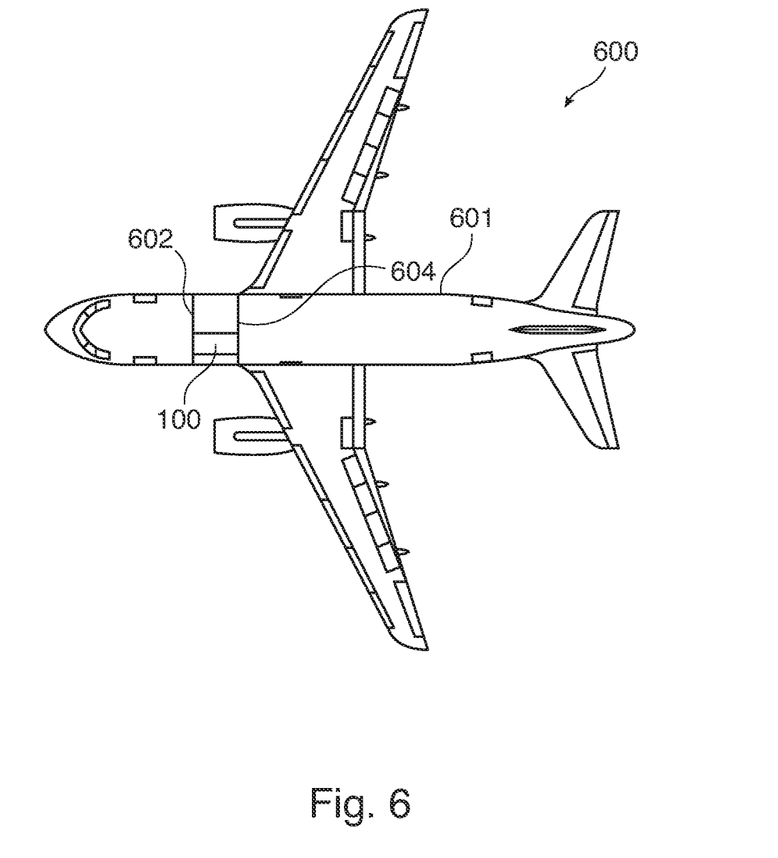
FIG. 6 is a schematic, horizontal cross-section of a means of transport according to an exemplary embodiment of the present disclosure.

FIG. 6 shows a means of transport 600, for example an aircraft. The aircraft 600 comprises a fuselage 601, and the fuselage 601 includes a first frame 602 and a second frame 604. The first frame 602 and the second frame 604 are structural elements. Furthermore, a luggage compartment 100 according to an embodiment of the present disclosure is attached to the first frame 602 and to the second frame 604.

Figure 7:
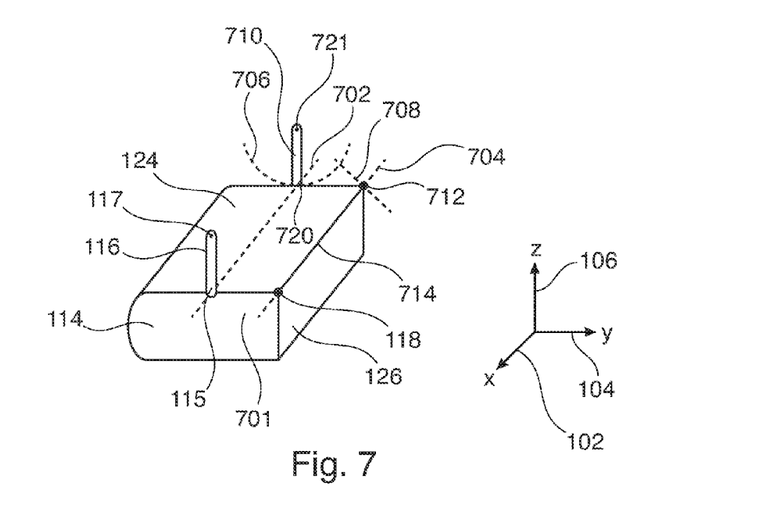
FIG. 7 is a schematic, three-dimensional drawing of a housing of a luggage compartment according to an exemplary embodiment of the present disclosure.

FIG. 7 shows a three-dimensional drawing of a luggage compartment 100 comprising a housing 114, a first connecting element 116, a second connecting element 710, a first sliding element 118, and a second sliding element 712.

The first connecting element 116 is pivotably attached to the housing 114 at a first portion 115 of the connecting element 116. For example, the first portion 115 of the first connecting element 116 is pivotably attached to an edge or close to an edge between the top wall 124 and a side wall 701 of the housing 114. Similarly, the second connecting element 710 is pivotably attached to the housing 114 at a first portion 720 of the second connecting element 710. Thus, the housing 114 can rotate around a rotation axis 702 defined by the first portion 115 of the first connecting element and the first portion 720 of the second connecting element 710.

Furthermore, the first connecting element 116 is adapted to be pivotably attached to a first structural element 111 at a second portion 117 of the first connecting element 116, and the second connecting element 710 is adapted to be pivotably attached to a fourth structural element at a second portion 721 of the second connecting element 710. Thus, the first rotation axis 720 can also move along a first circular path 706, which circular path 706 has a radius defined by the distance between the first portion 115 of the first connecting element 116 and the second portion 117 of the first connecting element 116, or by the distance between the first portion 720 of the second connecting element 710 and the second portion 721 of the second connecting element 710.

The first element 118 is adapted to be movably connected to a first rail 120, and the second sliding element is adapted to be movably connected to a second rail. The first rail 120 is attached to a second structural element 112, and the second rail is attached to a fifth structural element. The first sliding element 118 and the second sliding element 712 define a second rotation axis 704, around which second axis 704 the housing 114 is rotatable. Furthermore, since the first sliding element 118 and the second sliding element 712 are movable along the first rail 120 and the second rail, the second rotation axis 704 can move along a second path 708 defined by the first rail 120 and the second rail.

Figure 8:
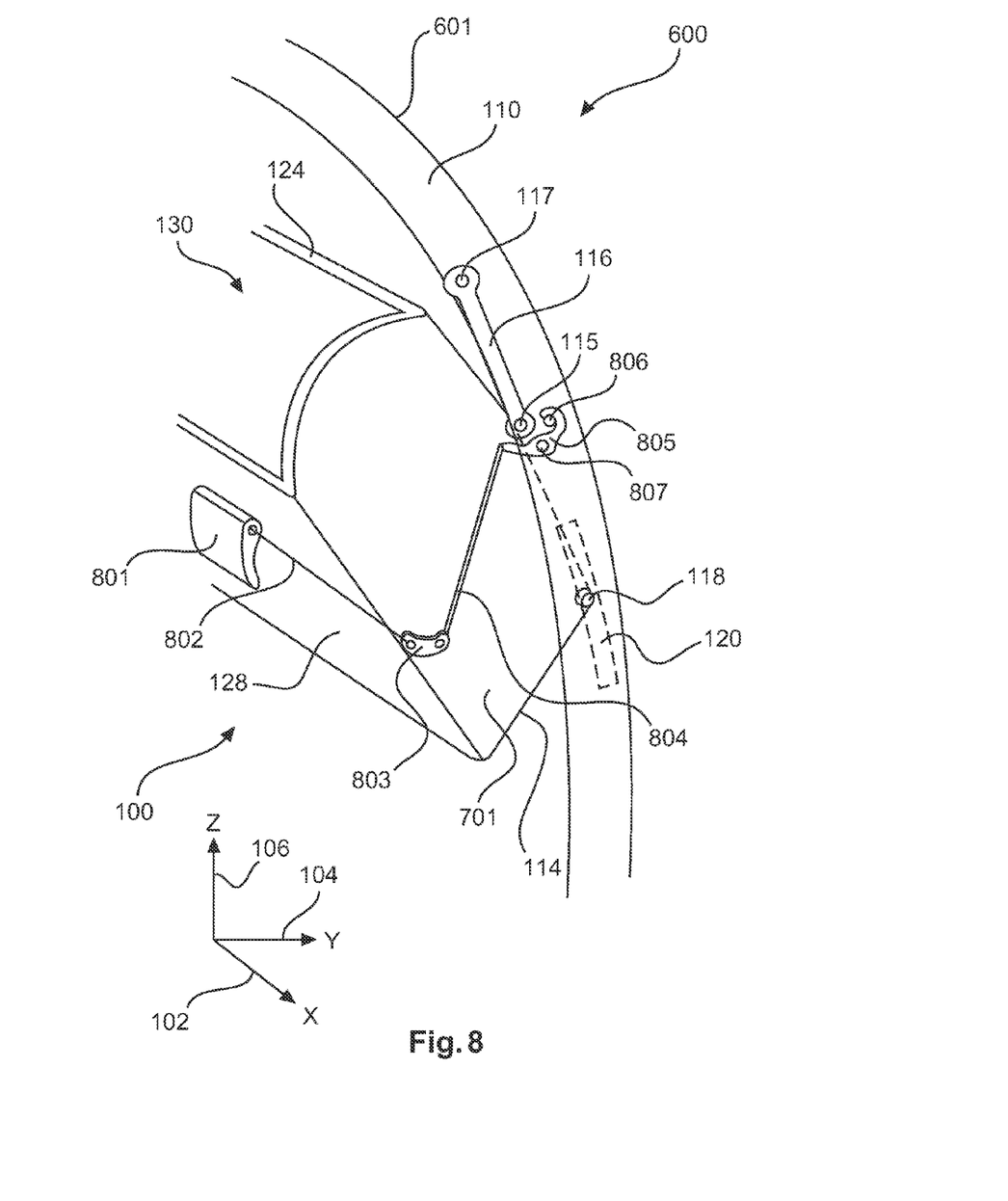
FIG. 8 is a schematic, three-dimensional drawing of a luggage compartment according to an exemplary embodiment of the present disclosure.

FIG. 8 shows a portion of a fuselage 601 of a means of transport 600 comprising a structural element 110 according to an exemplary embodiment of the present disclosure. Furthermore, the means of transport 600 comprises a luggage compartment 100 with a housing 114. The housing 114 comprises a top wall 124, a bottom wall 128, a side wall 701, as well as an opening 130 and is movably attached to the structural element 110 by means of a connecting element 116 and a sliding element 118. The connecting element 116 is pivotably attached to the top wall 124 of the housing at a first portion 115 of the connecting element 116. Furthermore, the connecting element 116 is pivotably attached to the structural element 110 at a second portion 117 of the connecting element. The sliding element is 118 is movably connected to a rail 120, which rail 120 is attached to the structural element 110.

Moreover, a locking mechanism for the luggage compartment 100 is shown. The locking mechanism comprises a swivelable hook 805 and an attachment element 806, e.g., a bolt. In the closed position, the hook 805 is configured to be attached to the attachment element 806 as shown in FIG. 8. In other words, the hook 805 may partially wrap around and/or hook into the attachment element 806 such that the housing 114 is fixable in the closed position of the luggage compartment 100. The hook 805 may be fixed on the top wall 124 of the housing with a pivoting point 807. For example, the hook 805 has the same rotation axis as the connecting element 116 on the housing. The hook 805 may further comprise a torsion spring such that the hook automatically hooks into the attachment element 806 when closing the luggage compartment 100.

In order open the luggage compartment 100 and/or to release the locking mechanism and/or the hook 805, the locking mechanism comprises a handle 801 located on the bottom wall 128 of the housing 114. A movement of the handle 801 is transmitted to a rotatable rod 802. Said rotatable rod 802 transmits a rotational movement to a translational movement of a linking rod 803 located on a side wall 701 of the housing 114. The rotational rod 802 and the linking rod 804 are coupled by means of a coupling element 803. The linking rod 804 transmits the translational movement to the hook 805 such that the hook 805 is released from the bolt 806.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A luggage compartment for being mounted in a means of transport, the luggage compartment comprising:

a housing for storing luggage, the housing comprising a top wall, a rear wall, a bottom wall and an opening;

a connecting element for mounting the housing to a first structural element of the means of transport, the connecting element pivotably attached to the top wall or the side wall of the housing at a first section of the connecting element;

a sliding element attached to an edge defined by the top wall and the rear wall of the housing;

wherein the connecting element is adapted for being pivotably attached to the first structural element of the means of transport at a second section of the connecting element; and wherein the sliding element is adapted for being movably connected to a rail, and the rail is attached to a second structural element of the means of transport.

2. The luggage compartment according to claim 1, wherein the top wall of the housing comprises a closing device for securing the housing to a lock striker plate, which lock striker plate is attached to a third structural element of the means of transport.

3. A means of transport with a luggage compartment, the luggage compartment comprising:

a housing for storing luggage, the housing comprising a top wall, a rear wall, a bottom wall, a side wall and an opening movable from an open position of the luggage compartment to a closed position of the luggage compartment;

wherein a first axis of the housing moves along a circular first path when moving the housing from the open position to the closed position;

wherein the circular first path is defined by a connecting element pivotably attached to the top wall or the side wall of the housing at a first section of the connecting element and pivotably attached to a first structural element of the means of transport in a second section of the connecting element;

wherein a second axis of the housing defines a second path when moving the housing from the open position to the closed position; and wherein the second path is defined by a rail mounted on a second structural element of the means of transport and the rail is adapted for guiding a sliding element attached to an edge defined by the top wall and the rear wall of the housing.

4. The means of transport according to claim 3, wherein a movement of the first axis and a movement of the second axis are performed at the same time when moving the luggage compartment from the open position to the closed position.

5. The means of transport according to claim 3, wherein, in the open position of the luggage compartment, the bottom wall of the housing is aligned horizontally; and wherein, in the closed position of the luggage compartment, the opening of the housing is positioned vertically above the rear wall of the housing.

6. The means of transport according to claim 3, further comprising:

a lock striker plate attached to a third structural of element of the means of transport; and wherein the lock striker plate lies against a portion of the top wall of the housing in the closed position of the luggage compartment.

7. The means of transport according to claim 3, further comprising:

a locking mechanism for fixing the housing in the closed position of the luggage compartment;

wherein the locking mechanism comprises a hook pivotably attached to the housing and an attachment element attached to the first structural element, the second structural element, or a third structural element;

wherein the hook is attachable to the attachment element such that the housing is fixable in the closed position of the luggage compartment.

8. The means of transport according to claim 3, wherein, in the closed position of the luggage compartment, the housing of the luggage compartment is at least partly positioned in a volume defined by an outside skin of the means of transport and a wall panel.

9. The means of transport according to claim 3, wherein the bottom wall of the housing seamlessly extends a contour of a wall panel in the closed position of the luggage compartment.

10. The means of transport according to claim 3, wherein the housing performs a rotational movement around a rotation axis when moving the housing from the open position to the closed position of the luggage compartment; and wherein the rotation axis of the housing moves from a position close to a center of gravity of the housing towards a position of the sliding element when moving the housing from the open position to the closed position of the luggage compartment.

11. The means of transport according to claim 3, wherein, in the closed position of the luggage compartment, a center of gravity of the housing is located at a first vertical position;

wherein, in the open position of the luggage compartment, the center of gravity of the housing is located at a second vertical position; and wherein the first vertical position is located vertically above the second vertical position.

12. The means of transport according to claim 3, wherein the means of transport is an aircraft.

13. An aircraft, comprising:

a first structural element;

a second structural element;

a luggage compartment including:

a housing for storing luggage, the housing comprising a top wall, a rear wall, a bottom wall, a side wall and an opening;

a connecting element for coupling the housing to the first structural element, and the connecting element is pivotably attached to the top wall or the side wall of the housing at a first section of the connecting element;

a sliding element attached to an edge defined by the top wall and the rear wall of the housing; and wherein the connecting element is pivotably attached to the first structural element at a second section of the connecting element and the sliding element is movably connected to a rail, and the rail is attached to the second structural element.

14. The aircraft according to claim 13, wherein the top wall of the housing comprises a closing device for securing the housing to a lock striker plate, which lock striker plate is attached to a third structural element of the means of transport.

* * * * *